(12) United States Patent
Horiuchi et al.

(10) Patent No.: US 7,755,884 B2
(45) Date of Patent: Jul. 13, 2010

(54) APPARATUS FOR REDUCING WEIGHT AND THICKNESS OF A PORTABLE COMPUTER

(75) Inventors: Mitsuo Horiuchi, Sagamihara (JP); Shigeki Mori, Yamato (JP); Hiroaki Agata, Yokohama (JP); Yasushi Honda, Chigasaki (JP); Tetsuya Ohtani, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 45 days.

(21) Appl. No.: 12/017,095

(22) Filed: Jan. 21, 2008

(65) Prior Publication Data

US 2008/0232058 A1  Sep. 25, 2008

(30) Foreign Application Priority Data

Mar. 19, 2007 (JP) .............................. 2007-069947

(51) Int. Cl.
*G06F 1/16* (2006.01)
*G02F 1/1333* (2006.01)

(52) U.S. Cl. ........................... 361/679.24; 361/679.21; 361/679.27; 361/679.55; 349/58; 248/918; 248/923; 312/223.2; 312/223.5; 345/169

(58) Field of Classification Search ................
361/679.01–679.06, 679.21–679.3, 679.55–679.59; 345/156, 157, 168, 169; 349/58–60; 313/512
See application file for complete search history.

(56) References Cited

U.S. PATENT DOCUMENTS 5,666,261 A * 9/1997 Aguilera ................ 361/679.09
6,166,788 A * 12/2000 Ha et al. ........................ 349/58
6,219,227 B1 * 4/2001 Trane ..................... 361/679.27
6,279,570 B1 * 8/2001 Mittelstadt et al. ...... 128/201.22
6,317,314 B1 * 11/2001 Kung et al. ............. 361/679.28
7,130,005 B2 * 10/2006 Takata et al. ................... 349/58
2007/0200931 A1 * 8/2007 Hwang et al. ................ 348/184

FOREIGN PATENT DOCUMENTS

| JP | 09-062400 | 3/1997 |
|---|---|---|
| JP | 2000-275635 | 10/2000 |
| JP | 2001-134195 | 5/2001 |
| JP | 2002-268063 | 9/2002 |
| JP | 2004-272237 | 9/2004 |
| JP | 2006-013797 | 1/2006 |
| JP | 2006-085605 | 3/2006 |

* cited by examiner

*Primary Examiner*—Zachary M Pape
*Assistant Examiner*—Nidhi Desai
(74) *Attorney, Agent, or Firm*—Antony P. Ng; Dillon & Yudell, LLP (57) ABSTRACT

An apparatus for reducing weight and thickness of portable computers is disclosed. The apparatus includes a lower housing, an upper housing and a cosmetic cover. The lower housing is configured to accommodate electronic elements therein. The upper housing, which has an opening inside, includes a periphery connected to the lower housing and a main bridge structure connected from one edge of the periphery to another edge of the periphery for providing structural support to the upper housing in the opening and for accommodating a display module therein. The cosmetic cover is configured to cover the upper housing.

14 Claims, 5 Drawing Sheets

APPARATUS FOR REDUCING WEIGHT AND THICKNESS OF A PORTABLE COMPUTER

PRIORITY CLAIM

The present application claims benefit of priority under 35 U.S.C. §§120, 365 to the previously filed Japanese Patent Application No. JP2007-069947 entitled, "Portable Computer" with a priority date of Mar. 19, 2007, which is incorporated by reference herein.

BACKGROUND OF THE INVENTION

1. Technical Field

The present invention relates to portable computers in general, and in particular to an apparatus for reducing weight and thickness of portable computers. Still more particularly, the present invention relates to an apparatus for reducing weight and thickness of a housing for holding a display module of a notebook computer.

2. Description of Related Art

Since heavy objects, such as documents and books, can be placed on top of a notebook computer, the mechanical strength of a housing of the notebook computer needs to be strong enough in order to protect the internal electronic components from the pressure exerted by the heavy objects. Particularly in a display-side of the housing in which a liquid crystal display is provided, the strength of a middle portion of an outer surface of the housing parallel to the display is the weakest. Thus, it is especially important to provide sufficient mechanical strength in the middle portion of the housing since a picture displayed on the liquid crystal display is easily affected (for example, distorted when the middle portion of the housing is pressed).

On the other hand, there has been constant demand for notebook computers to be thinner and lighter. Also, as wireless local-area networks have come into wide usage, many of the recently manufactured notebook computers are equipped with radio antennas for handling radio communications. The antennas for handling radio communications are arranged at an upper part or a side part of a liquid crystal display such that the sensitivities of the antennas are at maximum when a user uses the notebook computer. In addition, the number of antennas mounted in a display-side housing of a notebook computer tends to increase in order to meet the ever increasing frequency ranges for higher data transfer rates.

Consequently, it would be desirable to provide an improved apparatus for reducing weight and thickness of a housing for holding a display module of a notebook computer without compromising its mechanical strength.

SUMMARY OF THE INVENTION

In accordance with a preferred embodiment of the present invention, an apparatus includes a lower housing, an upper housing and a cosmetic cover. The lower housing is configured to accommodate electronic elements therein. The upper housing, which has an opening inside, includes a periphery connected to the lower housing and a main bridge structure connected from one edge of the periphery to another edge of the periphery for providing structural support to the upper housing in the opening and for accommodating a display module therein. The cosmetic cover is configured to cover the upper housing.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
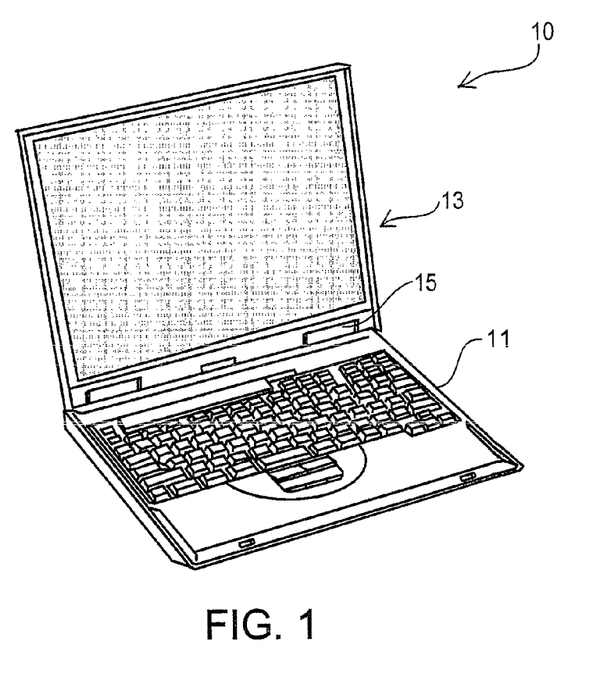
FIG. 1 is a perspective view of a notebook computer, in accordance with a preferred embodiment of the present invention.

With reference now to the drawings, and in particular to FIG. 1, there is depicted a perspective view of a notebook computer 10, in accordance with a preferred embodiment of the present invention. The notebook computer 10 includes a main housing 11, which has a surface on which a keyboard and a pointing device are mounted and in which many devices are accommodated, and a display unit 13 having a surface on which a liquid crystal display (LCD) is mounted. The display unit 13 is attached to the main housing 11 via a connecting portion 15.

Figure 2:
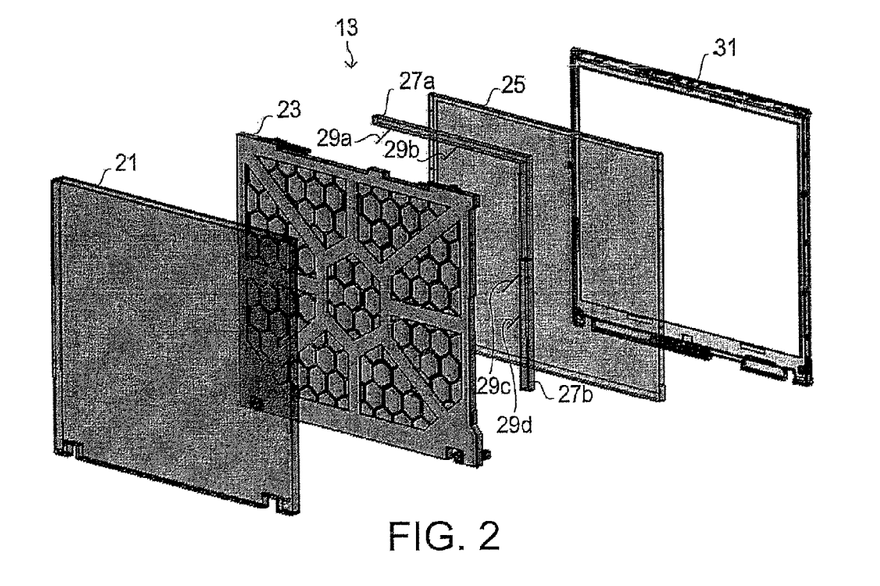
FIG. 2 is an exploded perspective view of a display unit of the notebook computer from FIG. 1, in accordance with a preferred embodiment of the present invention.

FIG. 2 is a perspective view of the display unit 13. The display unit 13 includes a cosmetic cover 21, an upper housing 23, antennas 27a and 27b, a display module 25, and a bezel 31. The cosmetic cover 21 forms a front surface of the notebook computer 10 when the notebook computer 10 is closed. The cosmetic cover 21 is formed of plastic in a box shape. In addition, while the thickness of the cosmetic cover 21 is approximately 1 mm, the thickness of a middle portion thereof is approximately 2 to 3 mm in order to provide reinforcement to the middle portion of the cosmetic cover 21. The cosmetic cover 21 is configured such that a user can attach the cosmetic cover 21 to the upper housing 23 in known methods, such as a fitting structure, a latch structure, or a screw. As such, a user can exchange a cosmetic cover according to his or her liking.

The upper housing 23 is integrally molded by die casting of a light alloy, such as a magnesium alloy or an aluminum alloy, and a lower part of the upper housing 23 is attached to the main housing 11 by the connecting portion 15 (not shown). The upper housing 23 accommodates the display module 25 therein so as to function as the entire structure of the display unit 13. The display module 25 includes a liquid crystal display element, a polarizing filter, a backlight, and the like. The display module 25 is connected to a video card (not shown) inside the main housing 11 through the connecting portion 15. The bezel 31 is attached to the upper housing 23 with the display module 25 interposed therebetween and functions as a cosmetic cover on a side of the display module 25 in the display unit 13.

The antenna 27a is attached to an upper side surface of the upper housing 23, and the antenna 27b is attached to a vertical side surface of the upper housing 23. Since the antennas 27a and 27b are attached to the edge of the upper housing 23, it is not necessary to cut out the upper housing 23 serving as a structure in order to secure the sensitivity. The antennas 27a and 27b are connected to a wireless module (not shown) inside the main housing 11 through cables 29a to 29d which run through a cable duct (not shown) provided on the upper housing 23. The cables 29a and 29b are connected to the antenna 27a, and the cables 29c and 29d are connected to the antenna 27b. In addition, the cables 29a to 29d only in the vicinity of antennas are shown in FIG. 2.

Figure 3:
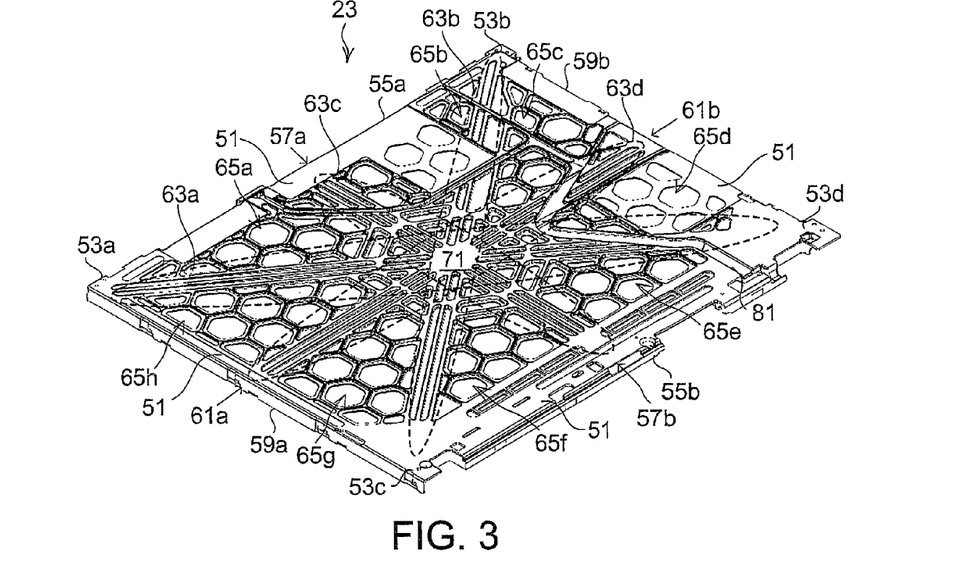
FIG. 3 is a perspective view of an upper housing of the notebook computer from FIG. 1, in accordance with a preferred embodiment of the present invention.

FIG. 3 is a perspective view of the upper housing 23 as viewed from a side of the cosmetic cover 21. The upper housing 23 is formed in a box shape such that the edge of a periphery 51, which has a shape in which an opening is formed inside a rectangular plate having a long side with a length of approximately 30 cm and a short side with a length of approximately 25 cm, is bent approximately 6-7 mm so as to accommodate the display module therein. One part and the other part of the periphery 51 are connected to each other by four main bridges 63a to 63d located in ranges indicated by dotted lines, respectively. The main bridges 63a to 63d are connected so as to become one body in a middle portion 71 such that the strength against pressure of the middle portion is increased. In addition, sub-bridges 65a to 65h each having a honeycomb structure are formed in openings divided by the periphery 51 and the four main bridges 63a to 63d, respectively. The sub-bridges 65a to 65h are connected to the main bridges and the periphery and are provided in order to support the cosmetic cover 21 against the pressure. In the upper housing 23, a cable duct 81 (will be described in detail later) through which the cables 29a to 29d run is formed in a path which crosses the main bridges 63a to 63d and the sub-bridges 65a to 65d on the same plane.

The main bridge 63a is formed so as to connect corners 53a and 53d of the periphery 51 to each other. The main bridge 63b is formed so as to connect corners 53b and 53c to each other. The main bridge 63c is formed so as to connect positions 57a and 57b near midpoints of long sides 55a and 55b to each other. The main bridge 63d is formed so as to connect positions 61a and 61b near midpoints of short sides 59a and 59b to each other. A pressing force applied to the cosmetic cover 21 in a state where the notebook computer 10 is closed is transmitted from the main bridges 63a to 63d to the periphery 51. Moreover, the pressing force is also transmitted to the main housing 11 from the corners 53a to 53d of the periphery, the positions 57a and 57b near the midpoints of the long sides, and the positions 61a and 61b near the midpoints of the short sides.

The main housing 11 is configured to have sufficient strength to stand against a pressing force at a position corresponding to each position to which the pressing force from the main bridge is transmitted. However, there is a portion of the main housing 11 that might not have sufficient strength to stand against a pressing force from the above, since various kinds of terminals, card slots, an optical drive, and the like are built in the periphery of the main housing 11. At the position on the periphery 51 corresponding to such a portion, it is preferable not to provide a main bridge.

Figures 4A, 4B, 4C:
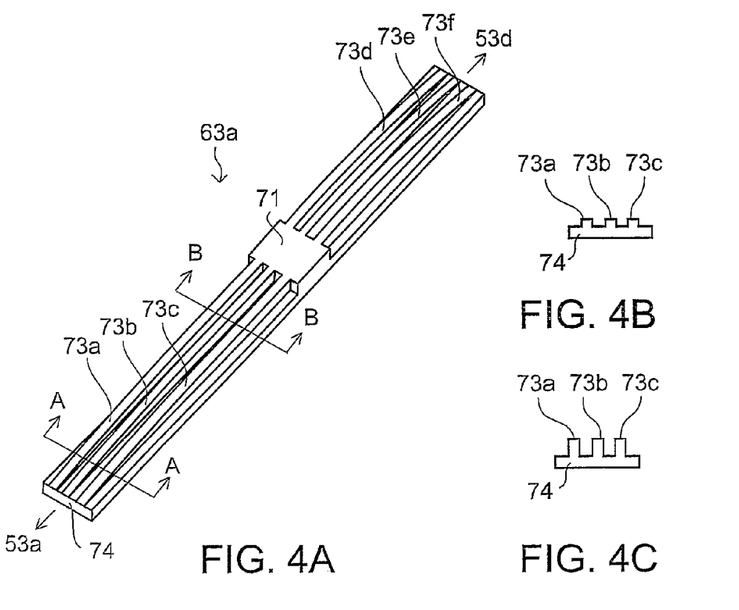
FIGS. 4A-4C are various views of the structure of a main bridge, in accordance with a preferred embodiment of the present invention.

FIG. 4A is a perspective view of the main bridge 63a when cut from the periphery 51. FIG. 4B is a cross-sectional view taken along a line A-A of FIG. 4A, and FIG. 4C is a cross-sectional view taken along a line B-B of FIG. 4A. The basic structures of the other main bridges 63b to 63d are the same as that shown in FIGS. 4A to 4C, even though the total length or the like slightly changes. As shown in FIG. 4A, the main bridge 63a has a structure in which a plate-shaped slender bottom 74 is reinforced with ribs 73a to 73f. In addition, the ribs 73a to 73c are provided in the direction from the vicinity of the middle portion 71 to the vicinity of the corner 53a, and the ribs 73d to 73f are provided in the direction from the vicinity of the middle portion 71 to the vicinity of the corner 53d. The width of the main bridge 63a is determined as the width of the plate-shaped bottom 74. In the present embodiment, the width of the long side 55a is approximately 30 cm, while the width of the main bridge 63a is approximately 20 mm (approximately 7% of the length of the long side).

The thickness of the main bridge 63a is determined by the height of the ribs 73a to 73f. The main bridge 63a is configured such that the thickness thereof increases from the periphery 51 toward the middle portion 71 to thereby form an arch shape as a whole. As shown in FIGS. 4B and 4C, the thicknesses of the ribs 73a to 73c on the B-B cross section close to the middle portion 71 is larger than that on the A-A cross section close to the periphery 51. If the bottom 74 is included, the thickness of the main bridge 63a is approximately 1 mm in the vicinity of the corners 53a and 53d which are both ends of the main bridge 63a, while the thickness of the main bridge 63a is approximately 3 through 4 mm in the vicinity of the middle portion 71. The length of each of the ribs 73a to 73f is approximately 12 through 16 cm, the width thereof is approximately 2 mm, and the height thereof near the middle portion 71 is approximately 2 through 3 mm. In addition, a gap of approximately 4 through 5 mm is provided among the ribs 73a to 73f. Moreover, in FIG. 4A, a description on a portion (will be described in detail later) where a rib is cut out by the cable duct 81 will be omitted for the simplicity sake.

Figure 5A:
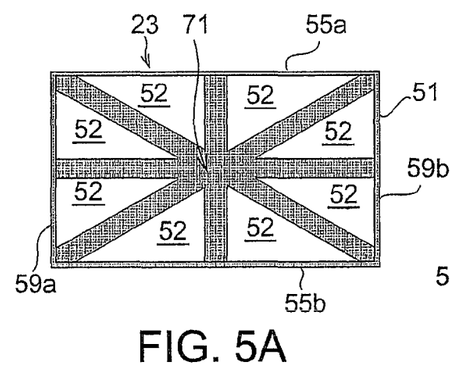
FIGS. 5A-5D are various top views of the configuration of a main bridge, in an upper housing.
Figure 5B:
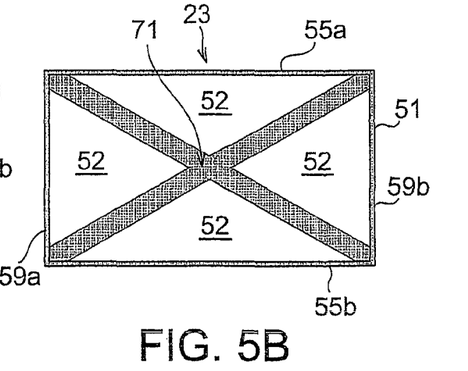
Figure 5C:
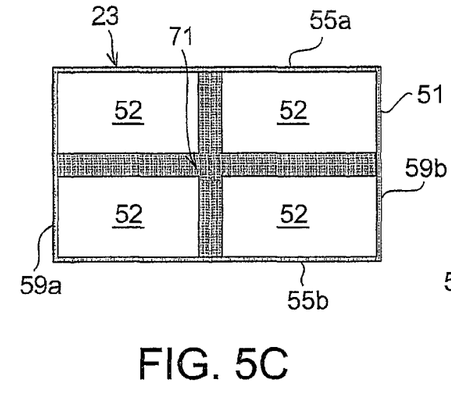
Figure 5D:
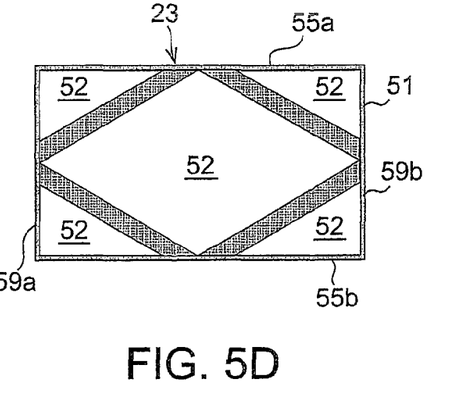

FIGS. 5A to 5D are top views of a main bridge in a rectangular upper housing. FIG. 5A shows the basic configuration of a main bridge in the upper housing 23, according to a preferred embodiment of the present invention, which is shown in FIG. 3. In a notebook computer, a corner of a lower housing generally has highest strength. Accordingly, as shown in FIG. 5B, only two main bridges each of which connects between opposite corners of the periphery 51 so as to cross the opening 52 may be provided. Alternatively, if there is sufficient strength at the positions corresponding to long and short sides of the lower housing, only a main bridge that connects the opposite long sides to each other and a main bridge that connects the opposite short sides to each other may be provided, as shown in FIG. 5C. In cases where a middle portion of a cosmetic cover is strong, four main bridges each of which connects long and short sides adjacent to each other may be provided, as shown in FIG. 5D. The basic constitution of a main bridge is not limited to those described above, but other patterns which may be considered by those skilled in the art are included in the range of the present invention. In the configurations shown in FIGS. 5A to 5C, the strength of a middle portion can be reinforced by connecting main bridges in the middle of the opening 52 so as to form the middle portion 71.

In the present embodiment, a counter force against the pressure of a cosmetic cover is obtained with a set of main bridges that cross the opening 52 formed inside the periphery. Although the configuration including the number of main bridges, width, a pattern, and the like is determined by the configuration of the display unit 13, the configuration of the main housing 11, the configuration of the cosmetic cover 21, and the like, both strength and light weight can be satisfied due to an opening and a set of main bridges. As the number of main bridges or the width of a main bridge increases, the strength of a cosmetic cover for standing against the pressure of the cosmetic cover can be increased, but the weight also increases. Accordingly, in the structure shown in FIG. 5A, the width of each main bridge structure is preferably set to approximately 5% through 10% of the length of a long side.

Figure 6A:
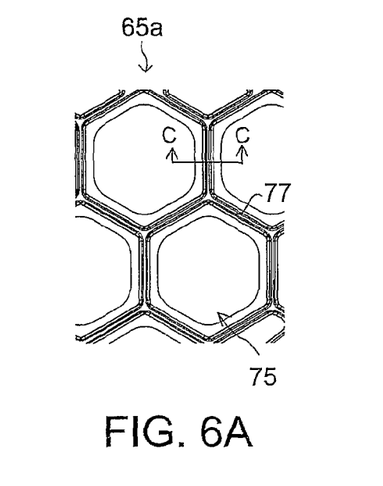
FIGS. 6A-6B are various top views of the structure of a sub-bridge, in accordance with a preferred embodiment of the present invention.
Figure 6B:
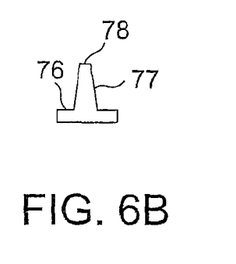

FIG. 6A is a partial top view of FIG. 3 illustrating the structure of the sub-bridge 65a, and FIG. 6B is a cross-sectional view taken along the line C-C of FIG. 6A. The basic cell structures of the other sub-bridges 65b-65h are the same as that shown in FIGS. 6A and 6B, even though the shapes of cells are changed by the connection dimensions among the periphery 51, the main bridges 63a to 63d, and the cable duct 81. The sub-bridge 65a is formed by using a rib 77 having a honeycomb structure which forms an opening cell 75, which is obtained, for example, by laying a regular hexagon having a side of approximately 15 mm. Due to a path of the cable duct and the positional relationship between the periphery and the main bridges, which will be described later, some opening cells do not have a regular hexagonal shape. The opening cell 75 is formed so as to have an opening rate of approximately 40 through 60% of the area.

The opening rate means a ratio of the sum of areas of openings of opening cells to the total area of a sub-bridge including the opening cells. In addition, the edge of a regular hexagon is divided by the rib 77, which has a width of approximately 1 mm, formed on a bottom 76 having a width of approximately 5 mm. A top 78 of the rib 77 is formed such that the thickness of the rib 77 increases as approaching the middle portion 71 so that a surface obtained by connecting tops of ribs of the main bridges 63a-63d to one another has a dome shape. In addition, the cosmetic cover 21 is also formed in the dome shape, and tops of the ribs of the main bridges 63a-63d and the tops of the ribs of the sub-bridges 65a-65h are attached inside the dome-shaped cosmetic cover.

Since the entire upper housing 23 is formed to have the dome shape, a counter force against the pressure of the middle portion increases. In addition, since there is no gap between the upper housing 23 and the cosmetic cover 21, the cosmetic cover 21 is not recessed or deformed by the pressure. Various shapes other than the honeycomb structure may be applied to the opening cell 75. Among the shapes, polygonal cell shapes that can be laid on a plane, such as a regular triangle, an isosceles triangle, a square, a rectangle, a parallelogram, and a rhombus may also be applied.

Figure 7:
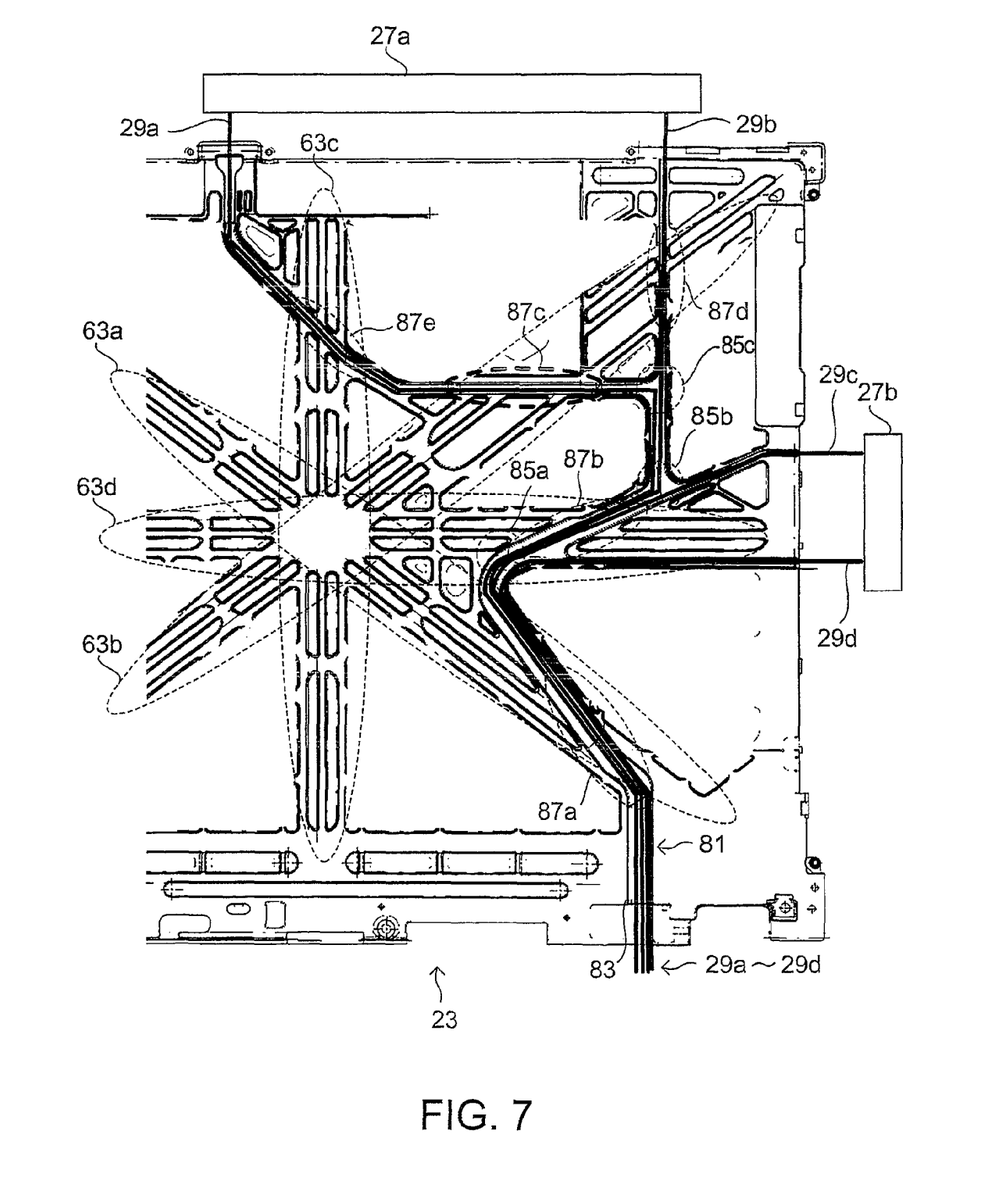
FIG. 7 is a plan view of a cable duct, in accordance with a preferred embodiment of the present invention.

FIG. 7 is a partial top view of the upper housing 23 illustrating a path of the cable duct 81. In FIG. 7, sub-bridges are omitted for the simplicity of drawing. In the present embodiment, the display unit 13 is formed such that the cable duct 81 through which a cable of an antenna runs is provided in the upper housing 23, in order to make the display unit 13 thin. Cables 29a-29d are drawn into the cable duct 81 from a cable inlet 83 located at a lower portion of the upper housing 23. The cable duct 81 branches off in a path for cables 29a-29c and a path for a cable 29d at a first branching position 85a, branches off in a path for the cables 29a and 29b and a path for the cable 29c at a second branching position 85b, and branches off in a path for the cable 29a and a path for the cable 29b at a third branching position 85c, such that each of the cables is guided to a connection terminal of a corresponding antenna. The cables 29a and 29b are connected to the antenna 27a, and the cables 29c and 29d are connected to the antenna 27b.

It is not desirable to make the cable duct 81 pass above or below main bridges and sub-bridges so as to cross the main bridges and the sub-bridges in a three-dimensional manner, from a point of view of making the upper housing 23 thin. Accordingly, in the present embodiment, the cable duct 81 is configured to cross the main bridges 63a-63d and the sub-bridges 65a-65e on the same plane. The cable duct 81 crosses the main bridge 63a at a first crossing position 87a, crosses the main bridge 63d at a second crossing position 87b, crosses the main bridge 63b at third and fourth crossing positions 87c and 87d, and crosses the main bridge 63c at a fifth crossing position 87e.

At the positions where the sub-bridges 65a-65e and the cable duct 81 cross each other, a route of the cable duct 81 is secured by changing the shape of the opening cell 75. At the positions where the main bridges 63a-63d and the cable duct 81 cross each other, it is necessary to cut off parts of ribs of the main bridges in order to secure the route of the cable duct 81. As a result, there occurs a problem that the strength of the main bridge is decreased.

Figure 8A:
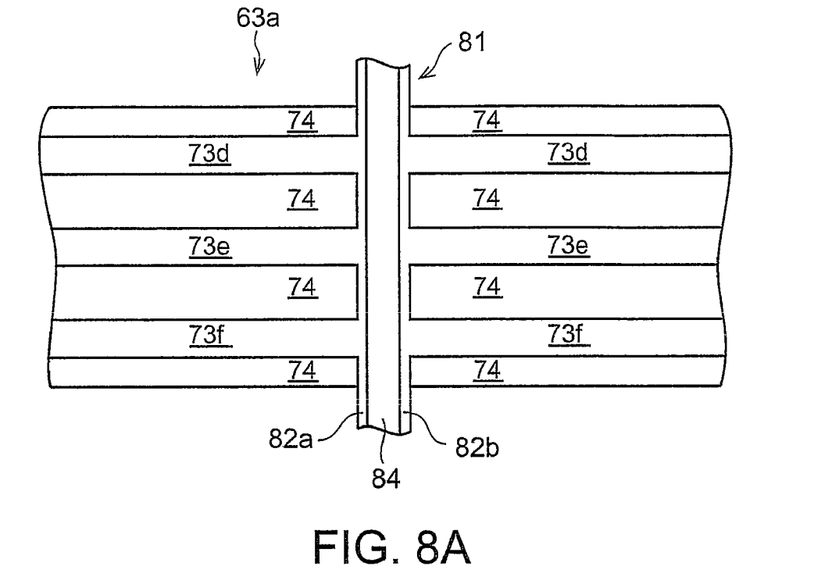
FIGS. 8A-8B are various plan views of a portion where a cable duct and main bridges cross each other, in accordance with a preferred embodiment of the present invention.
Figure 8B:
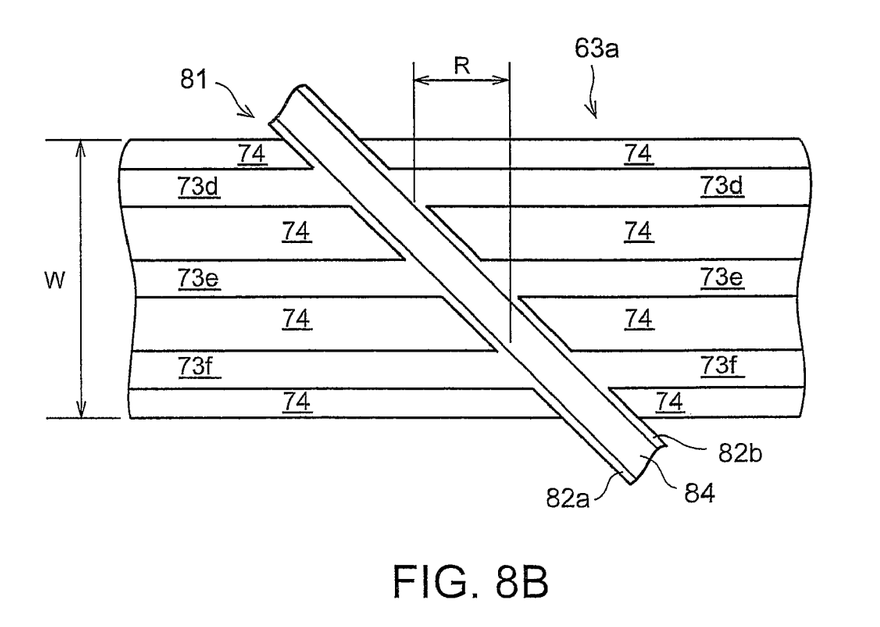

FIGS. 8A and 8B illustrate the structure of the first crossing position 87a, which is a position where the main bridge 63a and the cable duct 81 shown in FIG. 7 cross each other. FIG. 8A illustrates a state where it is assumed that the cable duct 81 and the main bridge 63a cross each other at an angle close to a right angle. The cable duct 81 is formed in a trench shape using a bottom surface 84 and two side walls 82a and 82b that vertically extend from both ends of the bottom surface 84. Accordingly, at the crossing position, a part of each of the ribs 73d-73f is cut out by the side walls 82a and 82b of the cable duct. If bending stress is applied to the main bridge 63a by pressure against the cosmetic cover 21, the stress is easily concentrated on the cut part of each of the ribs 73d-73f, and as a result, the strength is decreased.

For this reason, in the present embodiment, the cable duct 81 is configured to obliquely cross the main bridge 63a with respect to the longitudinal direction of the main bridge 63a in the crossing position 87a, as shown in FIG. 8B. In the case when the cable duct 81 is made to cut out the rib 73d and the rib 73f located at the outermost sides so as to cross the rib 73d and the rib 73f, a distance R in the longitudinal direction of the main bridge 63a, in which both the rib 73d and the rib 73f remain without being cut out as viewed from the direction perpendicular to the longitudinal direction of the main bridge, occurs between cut parts. This distance R is assumed to an overlap distance If the overlap distance R is provided, the strengths of cut parts of the ribs 73d and 73f located at the outermost sides are complemented by non-cut parts of the ribs 73d and 73f in the direction perpendicular to the longitudinal direction of the main bridge 63a. In addition, the rib 73e located inside is complemented by the non-cut parts of the ribs 73d and 73f located outside. Thus, it is possible to provide the cable duct 81 within the upper housing 23 while complementing the strength of a cut part, which is cut by the cable duct 81, with other ribs.

The overlap distance R is determined by the width W of the main bridge 63a, the width of the cable duct 81, a crossing angles between the cable duct 81 and the main bridge, the widths of the ribs 73d-73f, a gap between ribs. The stress caused by pressure applied to one rib increases as a gap between ribs increases. Accordingly, if the gap is too large, the strength of a cut part might not be complemented. In the case of a main bridge adopted in a display unit of a note PC, it may be considered that the gap between ribs is set to the extent that the pressure from a cosmetic cover is complemented. Even in this case, since an effect of complementing decreases as the gap between ribs increases, it is preferable to make the overlap distance R long in proportion to the width W of the main bridge.

Assuming that the width of the main bridge 63a is W, R>0.5 W is recommended. For example, when W is approximately 20 mm and R is approximately 15 mm, an angle at which the cable duct 81 and the ribs 73d-73f cross each other is approximately 15°. In addition, even in the cases of the other crossing positions 87b-87e, the configuration of each crossing part is determined as described in FIG. 8B.

At the positions where the cable duct 81 crosses the sub-bridges 65a-65e, preferably, tops of the side walls 82a and 82b of the cable duct are not higher than tops of the ribs of the main bridges 63a-63d and tops of the ribs of the sub-bridges 65a-65e. If tops of the side walls 82a and 82b of the cable duct are configured to form parts of ribs of the sub-bridges, supporting power of the sub-bridges with respect to the cosmetic cover 21 is not reduced. In addition, if a surface obtained by connecting tops of ribs of main bridges, tops of ribs of sub-bridges, and tops of side walls of a cable duct is formed to have a dome shape protruding toward the middle, the strength of the upper housing 23 can be further increased.

As described above, the upper housing 23 can be reduced in weight and in thickness while maintaining the strength by means of the main bridges 63a-63d formed with ribs, each of which has a shape in which a middle portion is thicker than a periphery, and the sub-bridges formed in openings divided by the periphery 51 and the four main bridges 63a-63d. For example, in a structure in which the upper housing 23 shown in FIG. 3 and the cosmetic cover 21 are combined, the strength of a middle portion measured as a displacement amount with respect to load was approximately 1.5 times that in the display-side housing of a conventional portable computer.

In addition, since the cosmetic cover 21 does not need to have strength like that in the known display-side housing by adopting the above-described structure, it becomes easy to select a material. As a result, it becomes easy to meet various kinds of demands for the aesthetic appearance. For example, it costs to perform surface treatment on a surface of a light metal such as a magnesium alloy or an aluminum alloy, which is a material used for the upper housing 23, so that the surface can be easily painted. However, the cosmetic cover 21 according to the present embodiment can be formed of a material, such as plastic, of which strength is low but on which surface treatment is easily performed.

In the case of attaching the antennas 27a and 27b to the upper housing 23, it is not necessary to form a notch or the like in a portion where the antennas are attached because a metal which reduces the sensitivity of the antennas 27a and 27b is not used in the cosmetic cover 21. Therefore, the sensitivity of the antennas 27a and 27b is not reduced, and the strength of the upper housing 23 is not reduced. If the cable duct 81 is provided within the main bridges and the sub-bridges of the upper housing 23 so as to secure a cable route, a set of antennas can be easily mounted in the upper housing while reducing the upper housing 23 in thickness.

The structure of the upper housing is not limited to notebook computer but may be used as a reinforcing member of an electronic device in order to reduce the electronic device in weight and in thickness. For example, even in a tablet computer or a personal digital assistant in which both a liquid crystal display and an electronic circuit are mounted in one housing, the structure of the upper housing may be adopted to reinforce the liquid crystal display. In addition, the structure of the upper housing may also be applied to reinforce a palm rest which is a part of a lower housing, on which a palm is put while a user is operating a keyboard.

While the invention has been particularly shown and described with reference to a preferred embodiment, it will be understood by those skilled in the art that various changes in form and detail may be made therein without departing from the spirit and scope of the invention.

What is claimed is:

1. A portable computer, comprising:
   a lower housing for accommodating electronic elements therein;
   an upper housing having an opening inside, wherein said upper housing further includes a periphery connected to said lower housing and a main bridge structure connected to said periphery for providing structural support to said upper housing in said opening and for accommodating a display module therein, wherein said periphery is in a rectangular shape made up of a first and second long edges along with a first and second short edges, wherein said main bridge structure consists of a first bridge structure connecting a midpoint of said first long edge to a midpoint of said first short edge, a second bridge structure connecting said midpoint of said first long edge to a midpoint of said second short edge, a third bridge structure connecting said midpoint of said first short edge to a midpoint of said second long edge, and a fourth bridge structure connecting said midpoint of said second short edge to said midpoint of said second long edge; and
   a cosmetic cover for covering said upper housing.

2. The portable computer of claim 1, wherein said cosmetic cover is made of synthetic resin, and said upper housing is made of metal.

3. The portable computer of claim 1, wherein said portable computer includes an antenna located outside said upper housing covered by said cosmetic cover.

4. The portable computer of claim 1, wherein said main bridge structure includes a rib formed in a longitudinal direction thereof, wherein said rib is formed in an arch shape such that a thickness of said rib increases from said periphery towards a middle of said rib.

5. The portable computer of claim 1, wherein said upper housing further includes a sub-bridge structure having a rib, wherein said sub-bridge structure is arranged in each opening divided by said main bridge structure.

6. The portable computer of claim 5, wherein said rib of said sub-bridge structure is connected to said main bridge structure and said periphery to form a plurality of opening cells.

7. The portable computer of claim 6, wherein a surface obtained by connecting a top of said main bridge structure to a top of said sub-bridge structure is configured to match an inner surface of said cosmetic cover.

8. The portable computer of claim 7, wherein an inner surface of said cosmetic cover is formed in a dome shape, and a top of said main bridge structure and a top of said sub-bridge structure are formed in a dome shape so as to be attached to said inner surface of said cosmetic cover.

9. The portable computer of claim 6, wherein said sub-bridge structure is configured to include a plurality of hexagon cell structures.

10. A portable computer, comprising:
    a lower housing for accommodating electronic elements therein;
    a display module connected to said electronic elements;

an upper housing, connected to said lower housing, for accommodating said display module therein, wherein said upper housing includes:
  a rectangular shape periphery made up of a first and second long edges along with a first and second short edges to form an opening;
  a main bridge structure having a bottom for connecting edges of said periphery so as to cross said opening and a plurality of ribs reinforcing said bottom, wherein said main bridge structure consists of a first bridge structure connecting a midpoint of said first long edge to a midpoint of said first short edge, a second bridge structure connecting said midpoint of said first long edge to a midpoint of said second short edge, a third bridge structure connecting said midpoint of said first short edge to a midpoint of said second long edge, and a fourth bridge structure connecting said midpoint of said second short edge to said midpoint of said second long edge;
an antenna, located outside said upper housing, for connecting to said electronic elements; and
a cosmetic cover for covering said upper housing and said antenna.

11. The portable computer of claim 10, wherein said upper housing further includes a sub-bridge structure having a rib, wherein said sub-bridge structure is arranged in each opening divided by said main bridge structure.

12. The portable computer of claim 11, wherein a surface obtained by connecting a top of each rib of said main bridge structure and a top of a rib of said sub-bridge structure.

13. The portable computer of claim 11, wherein said upper housing includes a cable duct having a cable connected to said antenna, wherein a side wall of said cable duct forms a part of said rib of said sub-bridge structure.

14. The portable computer of claim 13, wherein said cable duct obliquely crosses said main bridge structure so as to cut out each of said plurality of ribs, and a crossing angle between said main bridge structure and said cable duct and said width of said cable duct are determined such that a distance in which two ribs located at outermost sides in one main bridge structure overlap each other without being cut out together between cut parts in a direction perpendicular to said ribs, is included.

* * * * *